G. Banister,
Making Sockets for Hoes &c,

N°. 48,505. Patented July 4, 1865.

Witnesses;
Justus W. Finch
Edwin C. Watson

Inventor;
George Banister

UNITED STATES PATENT OFFICE.

GEORGE BANISTER, OF HARTFORD, VERMONT.

IMPROVED SOCKET FOR HOES, CHISELS, &c.

Specification forming part of Letters Patent No. 48,505, dated July 4, 1865.

*To all whom it may concern:*

Be it known that I, GEORGE BANISTER, of Hartford, in the county of Windsor and State of Vermont, have invented a new and useful Improvement in Sockets for Hoes, Forks, Chisels, and other Implements; and I do hereby declare that the following is a full, clear, and exact description of the same, reference being had to the annexed drawings, making a part of this specification.

Sockets for receiving the wooden handles of various utensils are sometimes made by "plating out" a portion of the metal on the same piece which forms the blade or body of the implement. This forms a good and durable socket, but for many uses it requires too great an expenditure of labor and material, especially when the articles are made of steel. Therefore it is a common way to draw out a solid round stem or shank on the piece of steel and to weld to it one end of a sheet-iron band or ferrule to form a socket, which is a cheaper method, but at the end of the steel shank, where the iron is united to it, the socket is contracted to its smallest diameter, therefore it has the least amount of metal and strength at that place, and as this weak point comes between the ends of the wooden handle and the steel shank it is subjected to greater strain than any other part; consequently such sockets are liable to fail on account of this deficiency of strength.

To obviate this is the object of my invention, which consists in a method of fitting or preparing the shank or stem on the metal forming the implement, and of uniting it with a sheet-metal ferrule or band, so as to make an increased thickness and strength of metal near the bottom or small part of the socket.

To enable others skilled in the art to make and use my invention, I will proceed to describe its construction.

Figure 4:
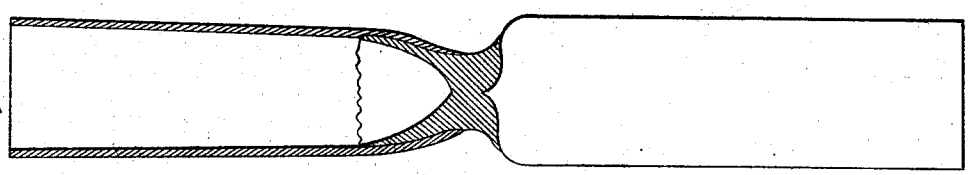
Figure 3:
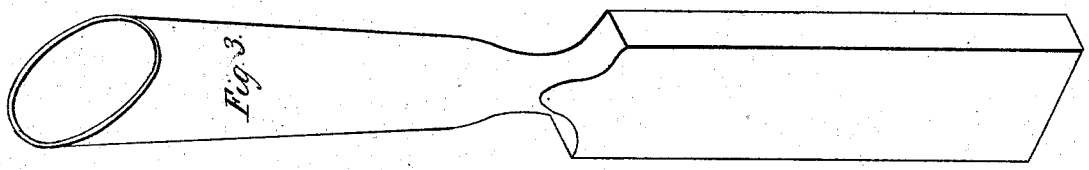
Figure 2:
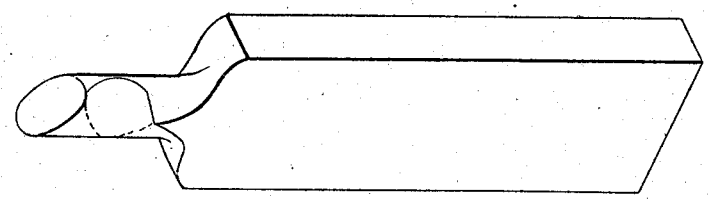
Figure 1:
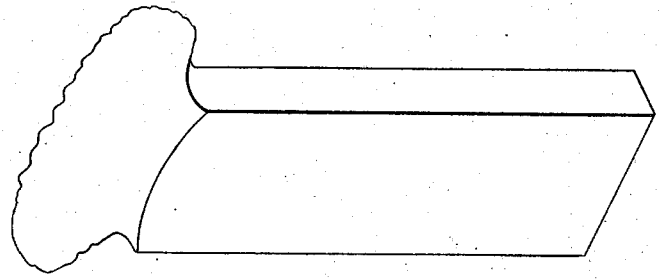

Drawing Figure 1 represents a piece of steel or metal, (on which a socket is to be formed,) with its end plated or drawn out to a proper length, breadth, and thickness, to be united to the metal which is to form the outer part of the socket. This plated part is next rolled up to form a stem or shank, as shown in Fig. 2, and then introduced into the end of the sheet-metal ferrule, which is to make the outer part of the socket, to which it is united by welding, a mandrel or former being used to spread out the plated shank and to shape the interior of the socket, while the exterior is finished to a proper form, as shown by Fig. 3, thus making a layer or plate of the metal of the shank around the interior of the lower part of the socket, as shown in sectional view, Fig. 4, giving an increased thickness and strength to the socket at the point which receives the greatest strain.

By this method I am enabled to use thinner iron, and to form a socket equaling those of steel in lightness, strength, and durability at much less expense.

What I claim as my invention, and desire to secure by Letters Patent, is—

The method of forming the shank or stem on the part to which the socket is to be attached, and of uniting it to a sheet-metal band or ferrule, so as to form an additional layer of metal to give the socket an increased thickness and strength near the bottom or smaller part thereof, substantially as herein shown and described.

GEORGE BANISTER.

Witnesses:
JUSTUS W. FRENCH,
EDWIN C. WATSON.